United States Patent
Brown

(10) Patent No.: US 8,693,135 B2
(45) Date of Patent: Apr. 8, 2014

(54) MAGNETIC STORAGE DEVICE WITH MEANS FOR SUPPLYING A BENEFICIAL VAPOR VIA A DESICCANT DEVICE

(75) Inventor: Charles Allan Brown, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 213 days.

(21) Appl. No.: 12/855,441

(22) Filed: Aug. 12, 2010

(65) Prior Publication Data

US 2012/0039000 A1    Feb. 16, 2012

(51) Int. Cl.
  *G11B 33/14*    (2006.01)

(52) U.S. Cl.
  USPC ............... 360/97.12; 360/97.13; 360/97.16

(58) Field of Classification Search
  USPC ............. 360/97.02, 97.12–97.13, 97.16
  See application file for complete search history.

(56) References Cited

U.S. PATENT DOCUMENTS

| | | | |
|---|---|---|---|
| 4,614,528 A | 9/1986 | Lennen | |
| 4,620,248 A | 10/1986 | Gitzendanner | |
| 4,863,499 A | 9/1989 | Osendorf | |
| 4,973,448 A | 11/1990 | Carlson et al. | |
| 5,324,448 A | 6/1994 | Mayeaux | |
| 5,325,916 A * | 7/1994 | Dunne et al. | 165/104.12 |
| 5,392,177 A * | 2/1995 | Chainer et al. | 360/97.02 |
| 5,743,942 A * | 4/1998 | Shelley et al. | 96/118 |
| 6,387,160 B1 * | 5/2002 | Dangieri et al. | 95/117 |
| 7,466,514 B2 * | 12/2008 | Brown et al. | 360/97.16 |
| 7,688,543 B2 | 3/2010 | Lee et al. | |
| 2005/0013040 A1 * | 1/2005 | Baumgart et al. | 360/97.02 |
| 2007/0236829 A1 * | 10/2007 | Brown et al. | 360/97.02 |
| 2008/0013206 A1 * | 1/2008 | Feliss et al. | 360/97.02 |
| 2008/0174910 A1 * | 7/2008 | Hirono et al. | 360/97.02 |
| 2008/0226534 A1 * | 9/2008 | Gidumal et al. | 423/416 |
| 2009/0116141 A1 * | 5/2009 | Brown | 360/97.02 |
| 2009/0244769 A1 | 10/2009 | Dai et al. | |
| 2010/0067143 A1 * | 3/2010 | Kawasaki | 360/97.02 |
| 2011/0122531 A1 * | 5/2011 | Kato et al. | 360/133 |

OTHER PUBLICATIONS

Chemical contamination at the head-disk interface in a disk drive, Jan. 2000 http://ieeexplore.ieee.org//xpls/abs_all.jsp?arnumber=824438.

* cited by examiner

*Primary Examiner* — Wayne Young
*Assistant Examiner* — Carlos E Garcia
(74) *Attorney, Agent, or Firm* — Christopher J. Brokaw; Brokaw Patent Law PC

(57) ABSTRACT

Approaches for desiccant device within an enclosure protecting sensitive electronic equipment. A hard-disk drive (HDD) may comprise a desiccant device that provides a source of a beneficial vapor, such as an antioxidant, a vapor corrosion inhibitor, or a colubricant, within an enclosure of the HDD. The desiccant device absorbs water vapor within the enclosure but does not absorb the beneficial vapor within the enclosure. The desiccant device may comprise a desiccant that has a plurality of micropores within a size range selected so as to allow the absorption of water but exclude the absorption of the beneficial vapor. The desiccant may be, but need not be, within the same physical container as the source of the beneficial vapor.

12 Claims, 3 Drawing Sheets

AO-L35 molecule

MAGNETIC STORAGE DEVICE WITH MEANS FOR SUPPLYING A BENEFICIAL VAPOR VIA A DESICCANT DEVICE

FIELD OF THE INVENTION

Embodiments of the invention generally relate to configuring the characteristics of gas within an enclosure that protects electronic equipment.

BACKGROUND OF THE INVENTION

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head and the surface of a magnetic-recording disk must be tightly controlled. An actuator relies on suspension's force on the read/write head to provide the proper distance between the read/write head and the surface of the magnetic-recording disk while the magnetic-recording disk rotates. A read/write head therefore is said to "fly" over the surface of the magnetic-recording disk. When the magnetic-recording disk stops spinning, a read/write head must either "land" or be pulled away onto a mechanical landing ramp from the disk surface. Because the read/write head flies so close to the surface of the magnetic-recording disk, the components within the HDD may be sensitive to moisture, contaminants, and other impurities and imperfections within the protective enclosure of the HDD.

To improve the operating conditions of the components within the HDD, a chemical may be placed within the protective enclosure of the HDD. This chemical may provide a vapor with beneficial properties (a "beneficial vapor") to improve the operation of the components within the HDD. For example, the beneficial vapor may help prevent corrosion, improve lubricity, or suppress the formation of smears. When a beneficial vapor is used within the interior of the HDD, it is desirable to regulate the concentration of the beneficial vapor to provide the most benefit to the components of the HDD. If the concentration of the beneficial vapor within the HDD is too great, the mix of gasses within the protective enclosure of the HDD may become saturated with the beneficial vapor, thereby causing the beneficial vapor to condense. The condensation of the beneficial vapor may decrease the benefit derived from the beneficial vapor and possibly interfere with the proper operation of the components of the HDD.

Modern HDDs have a very thin overcoat and lubricant layers as well as very thin or even absent protective layers on the read and write heads. To protect high performance drives against corrosion and other negative outcomes, it is desirable to control the relative humidity within the drives. This has been accomplished in certain HDDs through the use of desiccants.

SUMMARY OF THE INVENTION

It is observed that desiccants currently used in hard-disk drives (HDDs) may absorb, in addition to water, a vapor having beneficial properties (a "beneficial vapor") that is purposed introduced with the interior of the HDD. The absorption of such beneficial vapor by the desiccant decreases the concentration of the beneficial vapor within the interior of the HDD, thereby reducing or eliminating the benefits of the beneficial vapor to the components of the HDD.

Embodiments of the invention provide a desiccant that does not absorb a beneficial vapor (such as an antioxidant, vapor corrosion inhibitor, or colubricant) within the interior of a protective enclosure of electronic equipment, such as a HDD, but nevertheless, absorbs water within the interior of the protective enclosure. Moreover, some embodiments of the invention provide a desiccant which may act as a source of the beneficial vapor within the interior of the electronic equipment.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for a desiccant that (a) absorbs water and (b) does not absorb a beneficial vapor within the interior of an enclosure protecting sensitive electronic equipment are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Embodiments of the invention may be used to configure the properties of gas within the interior of a protective enclosure of a wide-variety of electronic equipment. For purposes of providing a concrete example, particular embodiments of the invention shall be described with reference to a hard-disk drive (HDD). However, desiccants according to embodiments of the invention may be used within the interior of many types of electronic equipment to configure the properties of gas therein.

Figure 1:
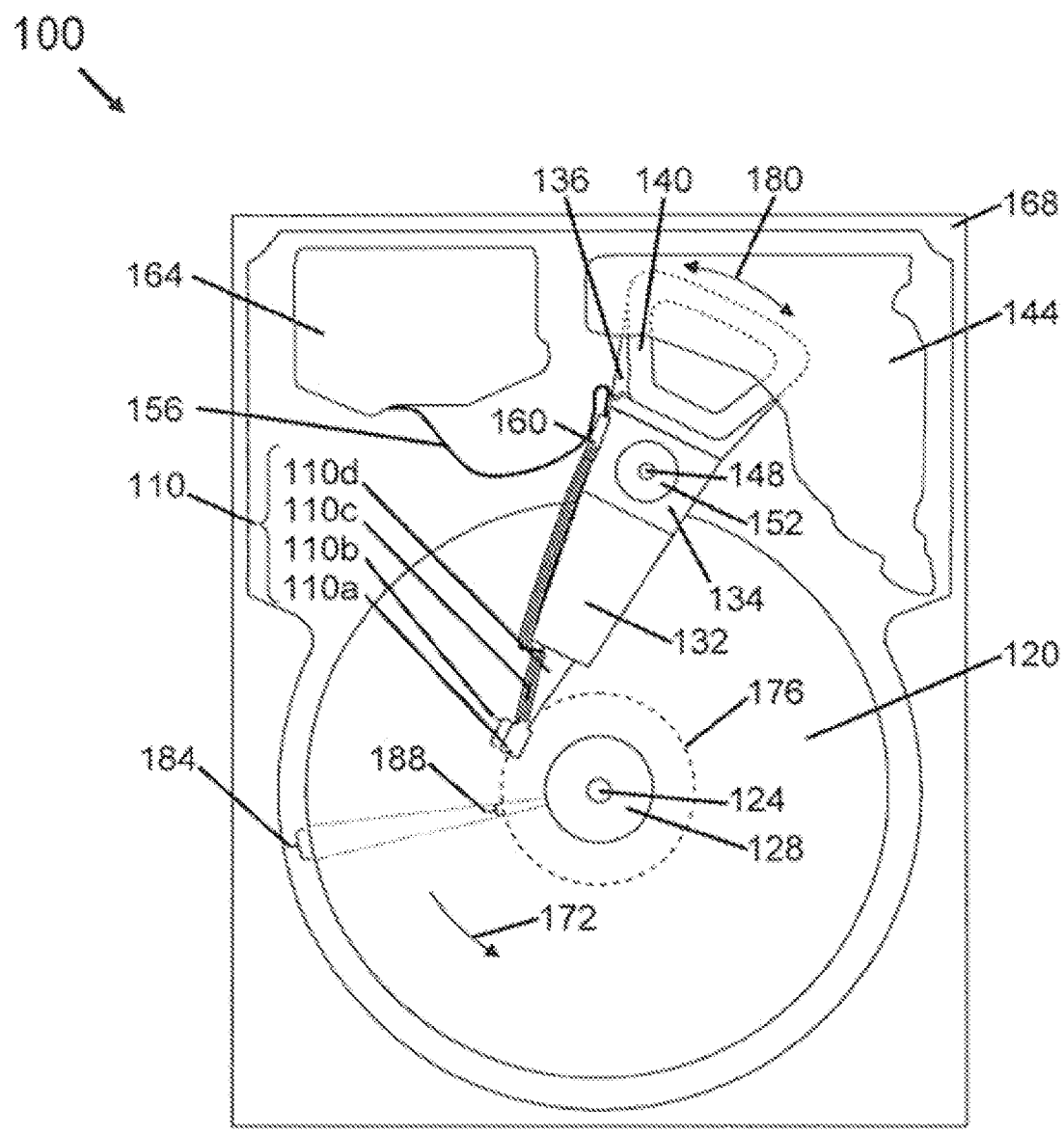
FIG. 1 is a plan view of an HDD according to an embodiment of the invention.

In accordance with an embodiment of the invention, a plan view of a HDD 100 is shown in FIG. 1. FIG. 1 illustrates the functional arrangement of components of the HDD including a slider 110b that includes a magnetic-recording head 110a. The HDD 100 includes at least one head gimbal assembly (HGA) 110 including the head 110a, a lead suspension 110c attached to the head 110a, and a load beam 110d attached to the slider 110b, which includes the head 110a at a distal end of the slider 110b; the slider 110b is attached at the distal end of the load beam 110d to a gimbal portion of the load beam 110d. The HDD 100 also includes at least one magnetic-recording disk 120 rotatably mounted on a spindle 124 and a drive motor (not shown) attached to the spindle 124 for rotating the disk 120. The head 110a includes a write element and a read element for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, in accordance with an embodiment of the present invention, electrical signals, for example, current to the voice coil 140 of the VCM, write signal to and read signal from the PMR head 110a, are provided by a flexible cable 156. Interconnection between the flexible cable 156 and the head 110a may be provided by an arm-electronics (AE) module 160, which may have an onboard pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110b rides so that the slider 110b flies above the surface of the disk 120 without making contact with a thin magnetic-recording medium of the disk 120 in which information is recorded. The electrical signal provided to the voice coil 140 of the VCM enables the head 110a of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110a of the HGA 110 reads the servo-burst-signal pattern which provides a position-error-signal (PES) to the servo electronics, which controls the electrical signal provided to the voice coil 140 of the VCM, enabling the head 110a to follow the track 176. Upon finding the track 176 and identifying a particular sectored track portion 188, the head 110a either reads data from the track 176 or writes data to the track 176 depending on instructions received by the disk controller from an external agent, for example, a microprocessor of a computer system.

Embodiments of the invention also encompass HDD 100 that includes the HGA 110, the disk 120 rotatably mounted on the spindle 124, the arm 132 attached to the HGA 110 including the slider 110b including the head 110a.

Figure 2:
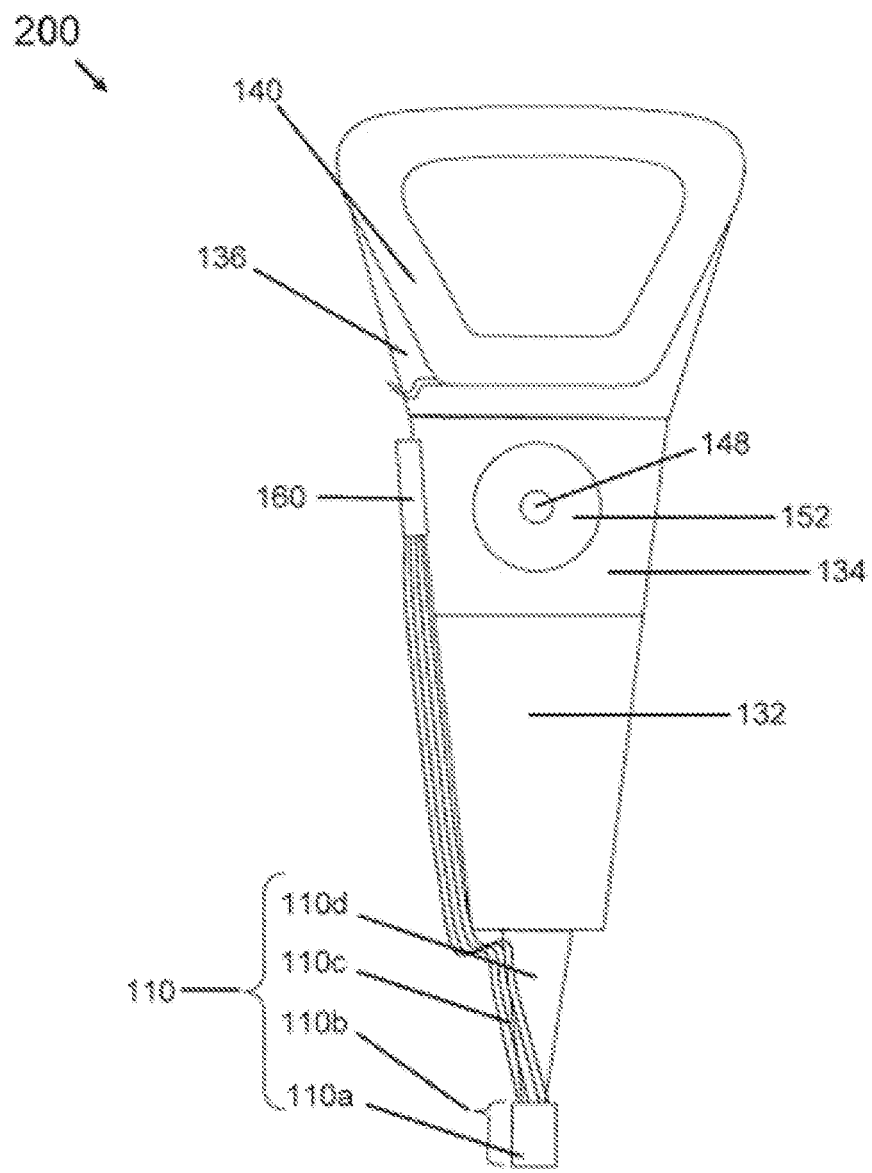
FIG. 2 is a plan view of a head-arm-assembly (HAA) according to an embodiment of the invention.

With reference now to FIG. 2, in accordance with an embodiment of the present invention, a plan view of a head-arm-assembly (HAA) including the HGA 110 is shown. FIG. 2 illustrates the functional arrangement of the HAA with respect to the HGA 110. The HAA includes the arm 132 and HGA 110 including the slider 110b including the head 110a. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Configuring the Characteristics of Gas within the Interior of Electronic Equipment Embodiments of the invention advantageously provide a desiccant, for use within the interior of electronic equipment (such as HDD 100), which does not absorb a beneficial vapor while still absorbing water vapor. Further, a desiccant according to certain embodiments may be constructed to act as a source of the beneficial vapor. In this way, embodiments of the invention advantageously enable a beneficial vapor to achieve its desired effect without any reduction in concentration due to unintended absorption by a desiccant. If the desiccant is designed to act as a source of the beneficial vapor, then the desiccant may be comprised within a single package or delivery mechanism within the interior of HDD 100. If the desiccant is not designed to act as a source of the beneficial vapor, then the source of the beneficial vapor may be comprised within one package or delivery mechanism within the interior of HDD 100, and the desiccant may be comprised within another package or delivery mechanism within the interior of HDD 100.

Types and Sources of Beneficial Vapors

Embodiments of the invention may employ a desiccant that does not absorb a wide variety of beneficial vapors. Beneficial vapors not absorbed or affected by desiccants according to embodiments may have many different beneficial properties, e.g., the beneficial vapor may act as an antioxidant, a vapor corrosion inhibitor, and/or a colubricant within the interior of HDD 100.

For purposes of providing a concrete example, a beneficial vapor that is an antioxidant shall be discussed in examples herein, although those in the art shall appreciate that embodiments of the invention may be employed with any type or class of beneficial vapor. A wide range of organic molecules may be used to produce a beneficial vapor that is an antioxidant.

Figure 3:
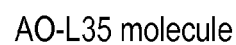
FIG. 3 is an illustration of an exemplary organic molecule, which in sufficient quantities, may serve as a source of beneficial vapor according to an embodiment of the invention.
Figure 3:
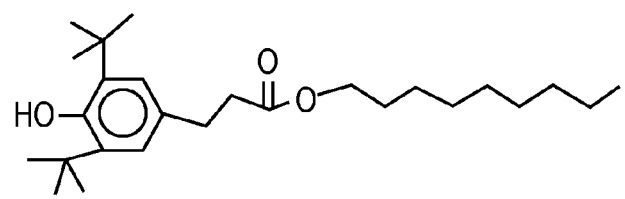

One type of organic molecules that may be used by embodiments is hindered phenols, such as the molecule illustrated in FIG. 3. FIG. 3 depicts an ortho-di-t-butyl phenol based antioxidant with an ester function linking the antioxidant to a carbon based alcohol molecule. The molecule shown in FIG. 3 is designated AO-L35. The AO-L35 molecule is a non-limiting illustrative example of a type of molecule which could serve of a source of the beneficial vapor. The structure of an organic molecule may be varied or altered to provide desirable properties, such as solubility in oil or plastic or to lower to vapor pressure in order to retain the material and its desirable properties for a longer period of time. For example, in the organic molecule shown in FIG. 3, the side chain attached to the ester function ($-CO2-$) may be altered using standard methods of organic chemistry. Analogs of the organic molecule of FIG. 3 can be obtained with the side chain lengthened, comprised of a mixture of similar side chains, or similar alterations. Similar alterations may be performed on other types of beneficial vapors.

In an embodiment, organic material, comprised of organic molecules, may serve as a source of the beneficial vapor. The organic material may be selected to provide a vapor having a low but finite vapor pressure. The organic material serving as the source of the beneficial vapor may be composed of a single type of organic molecule or a mixture of several types of organic molecules.

To provide the beneficial effects of an organic molecule at a critical surface in HDD 100, such as the surface of the magnetic storage disk or the read/write head, the organic molecules must be transported from the source of the organic molecules to the critical surface as a vapor. High concentrations of vapor may provide more assurance that the beneficial effects of the vapor will be realized; however, relying on high concentrations of beneficial vapor typically results in a rapid exhaustion of the source of the beneficial vapor. In addition, high concentrations of beneficial vapor typically require a large amount of the organic material to provide the beneficial vapor, which adds to cost and consumption of the limited space within HDD 100. Moreover, high concentrations of vapor may even induce problem conditions from excessive buildup or accumulation of organic material on the slider or at the head/disk interface. On the other hand, excessively low vapor pressure may prevent sufficient organic material to be transported, thereby handicapping the ability of the beneficial vapor to impart its desired affects.

In an embodiment, vapor pressure in the range of 1E-8 torr to 1E-16 torr at the drive operating temperature can allow from some transport of organic material but should not allow excessive buildup. The specific vapor pressure may depend upon a variety of factors. However, the vapor pressure of the organic material is primary a factor of how much organic material can be transported by the flow of air within HDD 100. To affect processes occurring at surfaces (such as that of the magnetic storage disk or the magnetic read/write head), one factor is the ability to form an adsorbed layer, which is known to be dependent upon the faction of saturation vapor pressure, represented as $P/Po$, where P is the actual vapor pressure existing and Po is the saturation vapor pressure at the operating temperature. Should a device or material exist in the interior of HDD 100 which absorbs the organic material, then the $P/Po$ ratio will be reduced and the adsorption at the critical interface will be suppressed. Thus, desiccants according to embodiments of the invention are configured to not absorb the beneficial vapor, thereby obviating the aforementioned problem.

To illustrate, if the chemical providing the beneficial vapor is adsorbed into a microporous material such as activated carbon or silica gel, then the vapor pressure will be suppressed by adsorption. This is the basis by which activated carbon functions in air filtration. However, other materials act as physical carriers that do not have the pore structure capable of such suppression of vapor pressure. In an embodiment, the organic material acting of the source of the beneficial vapor may be mixed, absorbed, or otherwise comprised within an absorbent material. The absorbent material should be capable of containing the organic material acting of the source of the beneficial vapor without reacting with it or significantly altering the beneficial vapor pressure. Non-limiting, illustrative examples of such an absorbent include diatomaceous earth, talc, porous calcium silicate, expanded PTFE, nonwoven cloths formed from airlaid or needle punched small fibers (such as plastic fibers), sintered inert powders, and polymer materials that have been stretched to provide a microporous structure. In many cases, the porosity may be varied as desired, e.g., the porosity of airlaid mats may be varied by calendaring to reduce the spaces between the fibers. Variations in the parameters of manufacture may increase or decrease the internal volume available and the ease of impregnation with the source of the beneficial vapor.

The combination of the absorbent material and vapor-providing organic material may be formed in a liquid or a solid, such as a powder, pellets, granules, any another physical form capable of dispensing the beneficial vapor therefrom. The motivation for combining the absorbent material and the vapor-providing organic material is that the resulting combination provides a convenient mechanism for delivering the beneficial vapor in a way that has relatively little or no effect on the vapor pressure.

Composition of the Desiccant

The desiccant used by embodiments of the invention should be capable of absorbing water and water vapor, but not the beneficial vapor. To achieve this function, a desiccant may have pores large enough to absorb water vapor and yet exclude the beneficial vapor. For example, the desiccant may have pores having a size of at least 0.3 nanometers but not larger than 0.5 nanometers. Advantageously, a desiccant having pores of this size does not promote the removal of the beneficial molecules or enhance the destruction of the beneficial molecule reactions catalyzed within the pores of the desiccant.

Typically, desiccant used in HDDs include silica gels and activated carbons. However, it is noted that silica gel can react with, or absorb strongly, beneficial vapors. Also, the AO-L135 molecule and similar materials appear to be destroyed by exposure to silica gel. Embodiments of the invention may use any substance, such as a zeolite, with a pore structure suitable to absorb water but not to absorb the beneficial vapor. An available class of materials, zeolitles, of which a Molecular Sieve is a specific trade name, can be prepared with uniform pores. The pore size can be controlled as part of the manufacture. These types of zeolites are produced in large quantities at relatively low cost. Zeolites designated 3A will absorb water vapor readily but exclude virtually all organic molecules.

A Variety of Packaging Mechanisms May be Used

Embodiments of the invention may employ a wide variety of different types of packaging mechanisms for containing one or more of (a) desiccants and (b) combinations of absorbent material and vapor-providing organic material. The packaging mechanism may be selected for its mechanical properties or it may have properties that aid in the creation of the beneficial vapor and/or the absorption of water vapor. In an embodiment, the packaging mechanism prevents the transmission of harmful airborne particles from originating from the interior or exterior of the packaging mechanism. For ease of reference, packaging mechanisms using desiccants according to embodiments of the invention shall be referred to as desiccant devices.

In an embodiment, the source of the beneficial vapor may be physically located within a desiccant device (so that the beneficial vapor diffuses out of the desiccant device). In another embodiment, the source of the beneficial vapor may cover all or a portion of the exterior of the desiccant device (for example, the beneficial vapor source may be applied to a porous Teflon exterior layer of the desiccant device.

Figure 4:
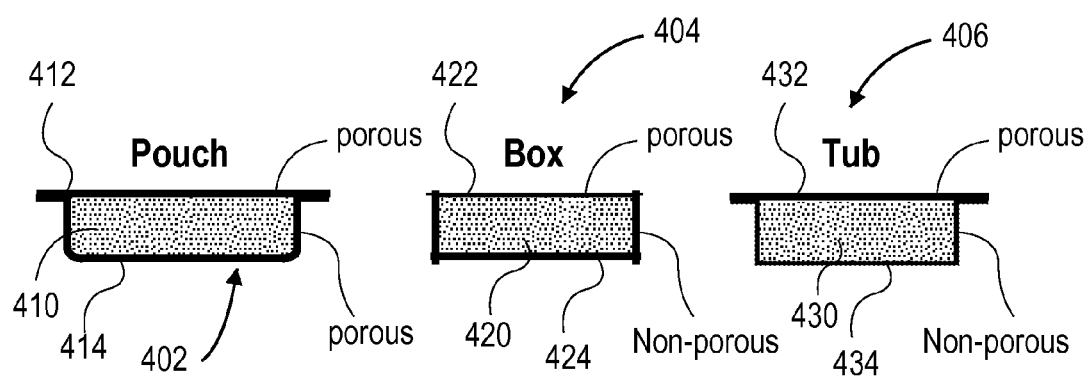
FIG. 4 is an illustration of several exemplary desiccant devices according to embodiments of the invention.

FIG. 4 is an illustration depicting several exemplary desiccant devices according to embodiments of the invention. As shown in FIG. 4, a desiccant device may be physically embodied as a variety of different structures, such as pouch 402, box 404, and tub 406. The examples shown in FIG. 4 are not intended to depict all the forms in which a desiccant device may take, but are merely exemplary of several ways in which a desiccant device could be constructed.

As shown in FIG. 4, the contents 410 of pouch 412 are entirely enclosed by a porous material (namely surface 412 and 414), whereas the contents (420 and 430 respectively) of box 404 or tub 406 are enclosed by a partially non-porous surface (namely surface 424 and surface 434 respectively). The non-porous surfaces of a desiccant device may be constructed using plastic material, while the porous surfaces of a desiccant device may be constructed using a microporous material that allows transmission of beneficial vapor molecules therethrough. In an embodiment, the microporous material comprises at least one layer of expanded PolyTetraFluoroEthylense (ePTFE).

In an embodiment, at least a portion of the surface (such as one or more of surface 412 and surface 414 for desiccant device 402, one or more of surface 422 and surface 424 for desiccant device 404, and one or more of surface 432 and surface 434 of desiccant device 406) of the desiccant device (a) allows transmission of beneficial vapor molecules therethrough and (b) prevents the transmission of harmful airborne particles therethrough. As airborne particles (for example, metal particles resulting from manufacture or wear) may harm or interfere with the intended operation of components of HDD 100, any portion of the desiccant device which is designed to allow the beneficial vapor to pass through should be constructed to prevent harmful airborne particles to pass through.

A desiccant device may be anywhere within the interior of HDD 100 in which the desiccant device is in communication with air space inside HDD 100. In an embodiment, the desiccant device may be affixed or positioned within the interior of HDD 100 such that the desiccant device is located in the flow of air when HDD 100 is operational. If the desiccant used in the desiccant device provides the source of the beneficial vapor within HDD 100, then a single desiccant device (such as desiccant device 402, 404, or 406) in the interior of HDD 100 may be used to (a) provide the beneficial vapor within the enclosure of HDD 100 (b) absorbs water vapor within the enclosure of HDD 100 without absorbing the beneficial vapor within the enclosure. On the other hand, the desiccant need not be configured to provide the source of the beneficial vapor within HDD 100, and so, in an embodiment, the desiccant and the source of the beneficial vapor (which may be an organic material combined with an absorbent material) are maintained separately (e.g., in separate compartments, such as two separate pouches 402, two separate boxes 404, two separate tubs 406, or two of pouch 402, box 404, and tub 406) within the desiccant device or may be comprised in different packaging mechanisms.

Illustrative Examples of Desiccant Devices

Several, non-limiting, illustrative examples of various embodiments will now be presented. A first illustrative embodiment involves the use of two different packaging mechanisms, referred to herein as a beneficial vapor packaging mechanism and a desiccant packaging mechanism. The beneficial vapor packaging mechanism (which may be pouch 402, box 404, or tub 406) comprises a substance that provides a source for beneficial vapor, while the desiccant package comprises a packaging mechanism (which may be a different pouch 402, box 404, or tub 406). In this example, the beneficial vapor packaging mechanism comprises 0.05 gm of AO-L35 that is absorbed into 0.5 g of diatomaceous earth. The diatomaceous earth is contained in a wrapper consisting of expanded PolyTetraFluoroEthylene (ePTFE). The desiccant packaging mechanism comprises 0.5 g of zeolitle 4A as is constructed using the same wrapper material. Both the beneficial vapor packaging mechanism and the desiccant packaging mechanism are positioned within the interior of HDD 100, either proximity or at distant locations, so long as both are in or very near the flow of air within the interior of HDD 100. For example, the beneficial vapor packaging mechanism may be positioned at a location in a corner of HDD 100 far from the platter(s). The desiccant packaging mechanism may be placed in a cavity very near to the platter(s). The beneficial vapor packaging mechanism will supply the beneficial vapor, which originates from the AO-L35, to the drive to suppress the formation of oxidative smears on the slider, which is particularly important when the drive is running. The desiccant packaging mechanism will absorb water vapor to control humidity during storage or any water vapor permeating into the drive while the drive is running. The construction of the desiccant packaging mechanism will not reduce or consume the beneficial vapor provided by the beneficial vapor packaging mechanism.

A second illustrative embodiment involves the use of a single packaging mechanism (which may correspond to either pouch 402, box 404, or tub 406, for example). The single packaging mechanism comprises 1.0 g of zeolitle 3A (located in interior 410 if pouch 402 is used, located in interior 420 if box 404 is used, and located in interior 430 if tub 406 is used) comprised in a wrapper material that is constructed using a laminate of ePTFE and nonwoven airload polypropylene having a thickness of 0.65 mm. At some point after preparation of the packaging mechanism, the packaging mechanism is heated and 0.05 g of warm AO-L35 is applied to the ePTFE of the packaging mechanism. Facilitated by the heat lowered viscosity, the AO-L35 will 'soak into' the pores of the laminate (surface 412 if pouch 402 is used, surface 422 if box 404 is used, and surface 432 if tub 406 is used). The amount of AO-L35 is not sufficient to block the porosity of the laminate, and so water vapor will be able to pass through. The treated packaging mechanism may be placed in any convenient location in the interior of HDD 100. The zeolite will absorb water vapor in storage as well as when HDD 100 is running. The zeolite will also supply the beneficial vapor to the interior of HDD 100 to suppress oxidative smear formation.

A third illustrative embodiment involves the use of a single plastic box 404 with one open side. A stock comprises AO-L35 on coarsely powdered calcium silicate is prepared, mixed, and then dispersed in the ratio by weight of 1 part AO-L35 and 10 parts of calcium silicate in interior 420. 0.75 g of zeolite 5A (desiccant) is placed into the plastic box in interior 420, followed by 0.55 g of the AO-L35 mixture (beneficial vapor source). The box 404 is sealed by welding a laminate (surface 422) of ePTFE on airlaid nonwoven polyester. This box 404 is positioned in the interior of HDD 100 during assembly of HDD 100 to supply the beneficial vapor to the interior of HDD 100 as well as absorb water therein.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive, comprising:
   an enclosure;
   a magnetic-recording head;
   a magnetic-recording disk rotatably mounted on a spindle; and
   a desiccant device providing a source of a beneficial vapor within the enclosure, wherein the desiccant device comprises a desiccant that absorbs water vapor within the enclosure, and wherein the desiccant does not absorb the beneficial vapor within the enclosure,
   wherein the desiccant device comprises a substance that provides the source of the beneficial vapor, wherein the desiccant is not the substance that provides the source of the beneficial vapor, and
   wherein the desiccant comprises a plurality of micropores within a size range selected so as to allow the absorption of water but exclude the absorption of the beneficial vapor,
   wherein the desiccant and the substance that provides the source of the beneficial vapor are intermingled within the interior of the desiccant device.

2. The hard-disk drive of claim 1, wherein the beneficial vapor is one or more of an antioxidant, a vapor corrosion inhibitor, and a colubricant.

3. The hard-disk drive of claim 1, wherein the desiccant is a zeolite with a pore structure suitable to absorb water but not to absorb the beneficial vapor.

4. The hard-disk drive of claim 1, wherein the desiccant has a pore structure of at least 0.3 nanometers but not larger than 0.5 nanometers.

5. The hard-disk drive of claim 1, wherein the substance that provides the source of the beneficial vapor is diatomaceous earth, porous calcium silicate, airlaid mats of plastic fibers, or polymer materials that have been stretched to provide a microporous structure.

6. The hard-disk drive of claim 1, wherein the source of the beneficial vapor is one or more types of organic molecules that possess a low but finite vapor pressure.

7. The hard-disk drive of claim 1, wherein at least a portion of the surface of the desiccant device (a) allows transmission of beneficial vapor molecules therethrough and (b) prevents the transmission of harmful airborne particles therethrough.

8. The hard-disk drive of claim 1, wherein a first portion of the surface of the desiccant device is composed of a plastic material, and a remaining portion of the surface of the desiccant device is composed of a microporous material that (a) allows transmission of beneficial vapor molecules therethrough and (b) prevents the transmission of harmful airborne particles therethrough.

9. The hard-disk drive of claim 8, wherein the microporous material comprises at least one layer of expanded PolyTetraFluoroEthylense (ePTFE).

10. The hard-disk drive of claim 1, wherein the desiccant device has a structure which prevents harmful airborne particles originating from the interior of the desiccant device to traverse through to the exterior of the desiccant device.

11. A hard-disk drive, comprising:
    an enclosure;
    a magnetic-recording head;
    a magnetic-recording disk rotatably mounted on a spindle; and
    a desiccant device providing a source of a beneficial vapor within the enclosure, wherein the desiccant device comprises a desiccant that absorbs water vapor within the enclosure, and wherein the desiccant does not absorb the beneficial vapor within the enclosure,
    wherein the desiccant device comprises a substance that provides the source of the beneficial vapor, wherein the desiccant is not the substance that provides the source of the beneficial vapor,
    wherein the desiccant comprises a plurality of micropores within a size range selected so as to allow the absorption of water but exclude the absorption of the beneficial vapor,
    wherein the desiccant and the substance that provides the source of the beneficial vapor are intermingled within the interior of the desiccant device, and
    wherein the source of the beneficial vapor are AO-L35 organic molecules.

12. A hard-disk drive, comprising:
    an enclosure;
    a magnetic-recording head;
    a magnetic-recording disk rotatably mounted on a spindle; and
    a desiccant device providing a source of a beneficial vapor within the enclosure, wherein the desiccant device comprises a desiccant that absorbs water vapor within the enclosure, and wherein the desiccant does not absorb the beneficial vapor within the enclosure,
    wherein the desiccant device comprises a substance that provides the source of the beneficial vapor, wherein the desiccant is not the substance that provides the source of the beneficial vapor, and
    wherein the desiccant comprises a plurality of micropores within a size range selected so as to allow the absorption of water but exclude the absorption of the beneficial vapor,
    wherein the desiccant is located within the interior of the desiccant device, and wherein the substance that provides the sources of the beneficial vapor is applied to pores of a laminate forming at least a portion of the exterior surface of the desiccant device.

* * * * *